United States Patent
Okamoto et al.

(10) Patent No.: US 12,313,475 B2
(45) Date of Patent: May 27, 2025

(54) TEMPERATURE SENSOR AND TEMPERATURE MEASUREMENT SYSTEM

(71) Applicant: MINEBEA MITSUMI Inc., Nagano (JP)

(72) Inventors: Takuma Okamoto, Fujisawa (JP); Ryota Shimoyama, Fujisawa (JP)

(73) Assignee: MINEBEA MITSUMI Inc., Nagano (JP)

( * ) Notice: Subject to any disclaimer, the term of this patent is extended or adjusted under 35 U.S.C. 154(b) by 380 days.

(21) Appl. No.: 17/596,432

(22) PCT Filed: Apr. 16, 2020

(86) PCT No.: PCT/JP2020/016657
§ 371 (c)(1),
(2) Date: Dec. 10, 2021

(87) PCT Pub. No.: WO2020/261722
PCT Pub. Date: Dec. 30, 2020

(65) Prior Publication Data
US 2022/0252463 A1 Aug. 11, 2022

(30) Foreign Application Priority Data
Jun. 26, 2019 (JP) ................ 2019-118909

(51) Int. Cl.
*G01K 7/06* (2006.01)
*G01K 1/08* (2021.01)
(52) U.S. Cl.
CPC ............. *G01K 7/06* (2013.01); *G01K 1/08* (2013.01)

(58) Field of Classification Search
CPC .................... G01K 1/08; G01K 7/06
See application file for complete search history.

(56) References Cited

U.S. PATENT DOCUMENTS

| 7,789,559 B2 | 9/2010 | Waser et al. |
| 2014/0153612 A1 | 6/2014 | Yonekura |

FOREIGN PATENT DOCUMENTS

| CN | 101907497 | 12/2010 | | |
| CN | 1939695 B | * 11/2012 | ............ | B29C 45/74 |

(Continued)

OTHER PUBLICATIONS

DE-3411332-A Bargende (Year: 1985).*
(Continued)

*Primary Examiner* — Mirellys Jagan
(74) *Attorney, Agent, or Firm* — JCIPRNET (57) ABSTRACT

Provided are a temperature sensor and a temperature measurement system capable of improving processability and assemblability. The temperature sensor (1) is a temperature sensor configured to measure a temperature of a resin (120) filling a die (110) in a resin molding device (100). The temperature sensor (1) includes a metal sheath (10) having a bottomed tubular shape, a pair of thermocouple element wires (20) accommodated in the metal sheath (10), and an insulator (30) provided around the pair of thermocouple element wires (20) in the metal sheath (10), and the temperature sensor (1) is a grounded sheath thermocouple including a tip as a temperature measuring contact for the resin (120). Further, the temperature sensor (1) further includes a housing (40) covering a periphery of a tip portion of the metal sheath (10), and a tip of the metal sheath (10) has a planar shape.

5 Claims, 7 Drawing Sheets (56) References Cited

FOREIGN PATENT DOCUMENTS

| EP | 0644410 A1 | * | 3/1995 | |
| GB | 2127215 A | * | 4/1984 | ............... G01K 1/16 |
| GB | 0764837 A1 | * | 3/1997 | |
| JP | 03-234518 A | | 10/1991 | |
| JP | 2003-035605 A | | 2/2003 | |
| JP | 2003080577 A | * | 3/2003 | |
| JP | 2014-109462 A | | 6/2014 | |
| JP | 6711997 B1 | | 6/2020 | |
| JP | 2020180863 | | 11/2020 | |
| WO | WO-2004052613 A2 | * | 6/2004 | ............. B29C 45/76 |

OTHER PUBLICATIONS

Anonymous, "Fine Diameter Thermocouple Transition Joint Probes," Omega, Sep. 2016, pp. 1-3.
"Office Action of Japan Counterpart Application" with English translation thereof, issued on Jun. 6, 2023, p. 1-p. 8.
"Search Report of Europe Counterpart Application", issued on Jun. 6, 2023, p. 1-p. 8.
International Search Report for corresponding International Application No. PCT/JP2020/016657 mailed Jul. 21, 2020.
Written Opinion for corresponding International Application No. PCT/JP2020/016657 dated Jul. 21, 2020 and English translation.
Office Action of China Counterpart Application, with English translation thereof, issued on May 30, 2024, pp. 1-13.

* cited by examiner

TEMPERATURE SENSOR AND TEMPERATURE MEASUREMENT SYSTEM

TECHNICAL FIELD

The present invention relates to a temperature sensor and a temperature measurement system.

BACKGROUND ART

Conventionally, a temperature sensor for measuring a temperature of a resin filling a die of a resin molding device has been widely known. As such a temperature sensor, for example, a temperature sensor being formed with two holes for guiding two thermocouple element wires to a tip of the temperature sensor and being formed by guiding the thermocouple element wires into the two holes, welding the thermocouple element wires to the temperature sensor, and then processing the tip of the temperature sensor has been proposed (for example, see Patent Document 1).

CITATION LIST

Patent Literature

Patent Document 1: U.S. Pat. No. 7,789,559

SUMMARY OF INVENTION

Technical Problem

In such a conventional temperature sensor, two holes for guiding two thermocouple element wires need to be processed. Herein, due to a reduction in size of the temperature sensor, the thermocouple element wires are also thinned, and thus there is a risk that it may become difficult to process the holes, and it may also become difficult to assemble the two thermocouple element wires into the two holes. Consequently, the conventional temperature sensor has been required to have a structure capable of improving processability and assemblability.

The present invention has been made in view of the problem described above, and an object of the present invention is to provide a temperature sensor and a temperature measurement system capable of improving processability and assemblability.

Solution to Problem

In order to achieve the object described above, a temperature sensor according to the present invention is a temperature sensor configured to measure a temperature of a resin filling a die in a resin molding device, the temperature sensor including: a metal sheath having a bottomed tubular shape; a pair of thermocouple element wires accommodated in the metal sheath; and an insulator provided around the pair of thermocouple element wires in the metal sheath, wherein the temperature sensor is a grounded sheath thermocouple including a tip as a temperature measuring contact for the resin, the temperature sensor further includes a housing covering a periphery of a tip portion of the metal sheath, and a tip of the metal sheath has a planar shape.

In the temperature sensor according to one aspect of the present invention, a diameter of a tip of the housing is equal to or less than 1 mm.

In the temperature sensor according to one aspect of the present invention, the tip of the metal sheath and the tip of the housing are flush.

In the temperature sensor according to one aspect of the present invention, at least a portion of the metal sheath is crimped to the housing.

In order to achieve the object described above, a temperature measurement system according to the present invention includes: in a resin molding device, the temperature sensor described above; and a temperature measurement unit configured to measure a temperature of a resin filling a die by the temperature sensor.

Advantageous Effects of Invention

A temperature sensor and a temperature measurement system according to the present invention can improve processability and assemblability.

DESCRIPTION OF EMBODIMENTS

An embodiment of the present invention will be described below with reference to the drawings.

Figure 1:
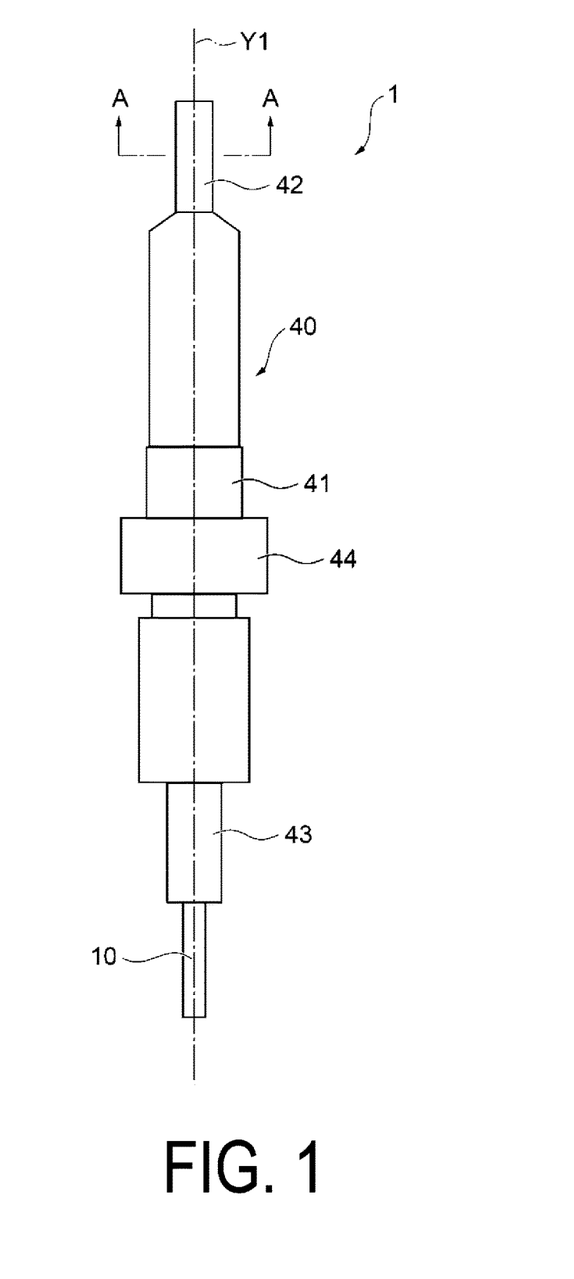
FIG. 1 is a side view illustrating a configuration of a temperature sensor according to an embodiment of the present invention.
Figure 2:
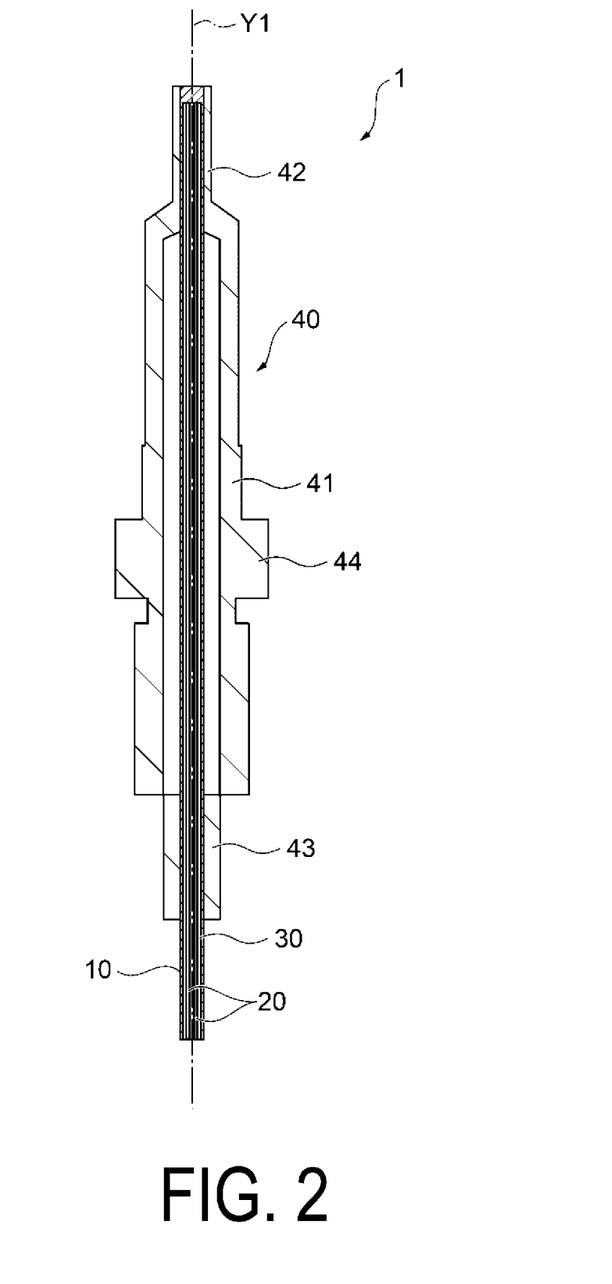
FIG. 2 is a cross-sectional view illustrating the configuration of the temperature sensor illustrated in FIG. 1.
Figure 3:
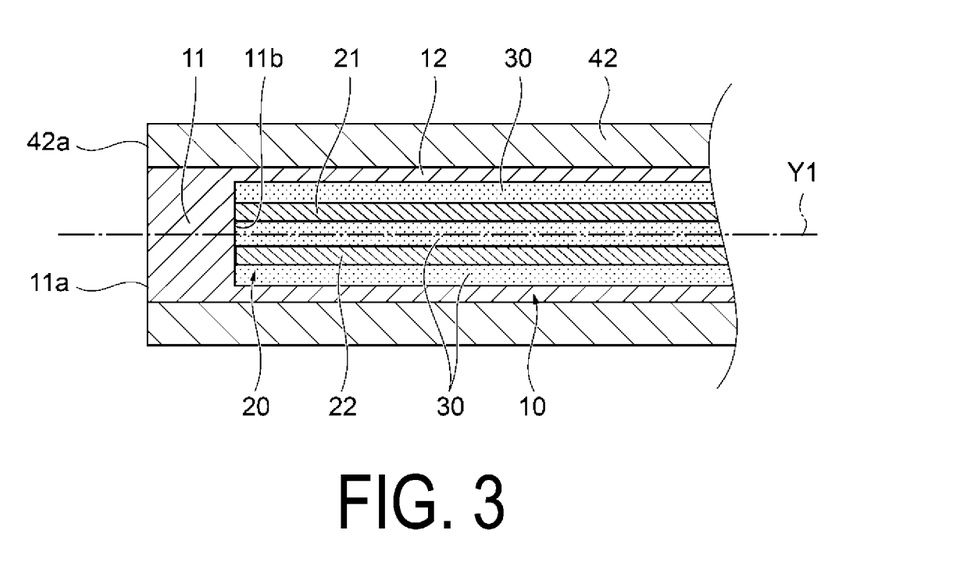
FIG. 3 is a cross-sectional view illustrating a configuration of a tip portion of the temperature sensor illustrated in FIG. 1.
Figure 4:
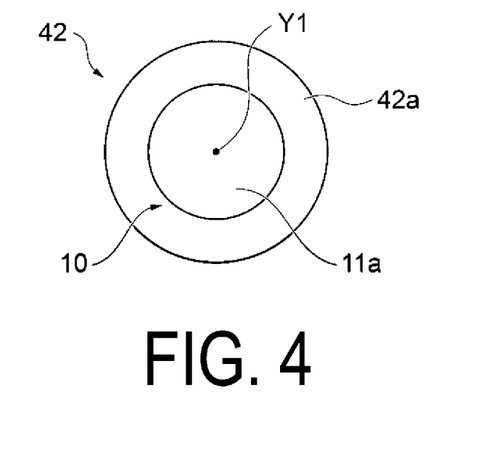
FIG. 4 is an end view illustrating the configuration of the tip portion of the temperature sensor illustrated in FIG. 1.
Figure 5:
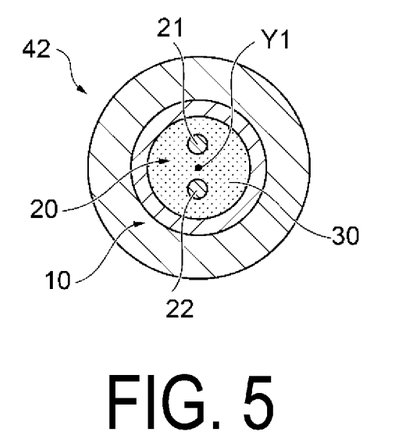
FIG. 5 is a cross-sectional view illustrating the configuration of the tip portion of the temperature sensor illustrated in FIG. 1 taken along an A-A line.

FIG. 1 is a side view illustrating a configuration of a temperature sensor 1 according to an embodiment of the present invention, and FIG. 2 is a cross-sectional view illustrating the configuration of the temperature sensor 1. FIG. 3 is a cross-sectional view illustrating a configuration of a tip portion of the temperature sensor, and FIG. 4 is an end view illustrating the configuration of the tip portion of the temperature sensor 1. FIG. 5 is a cross-sectional view illustrating the configuration of the tip portion of the temperature sensor 1 taken along an A-A line.

The temperature sensor 1 according to the embodiment of the present invention is a temperature sensor for measuring the temperature of a resin 120 (FIG. 6) filling a die 110 (FIG. 6) and/or a fixed-side die 112 (FIG. 6) in a resin molding device 100 (FIG. 6) (i.e., any one or both of at least a surface temperature of the resin 120 and a die temperature near the temperature sensor 1). The temperature sensor 1 includes a metal sheath 10 having a bottomed tubular shape, a pair of thermocouple element wires 20 accommodated in the metal sheath 10, and an insulator 30 provided around the pair of thermocouple element wires 20 in the metal sheath 10, and the temperature sensor 1 is a grounded sheath thermocouple including a tip as a temperature measuring contact for the resin 120. Further, the temperature sensor 1 further includes a housing 40 covering a periphery of a tip portion of the metal sheath 10, and a tip of the metal sheath 10 has a planar shape. Further, in the resin molding device 100, a temperature measurement system according to the embodiment of the present invention includes the temperature sensor 1 and a temperature measurement unit 140 configured to measure a temperature of the resin 120 filling the die 110 by the temperature sensor 1. A configuration of the temperature sensor 1 and the temperature measurement system will be specifically described below.

As illustrated in FIGS. 1 to 5, the temperature sensor 1 has an outer shape extending in parallel or substantially parallel with a direction of an axis line Y1 with the axis line Y1 as the center, and being formed in a columnar rod shape or a substantially columnar rod shape. As illustrated in FIG. 2, in the temperature sensor 1, the grounded sheath thermocouple including the metal sheath 10, the pair of thermocouple element wires 20, and the insulator 30 is accommodated in the housing 40, and a portion at another end side is exposed from the housing 40.

As illustrated in FIGS. 3 to 5, the metal sheath 10 extends in parallel or substantially parallel with the direction of the axis line Y1 with the axis line Y1 as the center, and is formed in a bottomed cylindrical shape or a substantially bottomed cylindrical shape. The metal sheath 10 includes a columnar portion 11 having a columnar shape or a substantially columnar shape, and a cylindrical portion 12 provided upright from another end side surface 11b of the columnar portion 11 and having a cylindrical shape or a substantially cylindrical shape. The columnar portion 11 functions as a temperature sensing portion configured to detect a temperature of the die 110 (FIG. 6) around the tip portion of the temperature sensor 1 and the resin 120 (FIG. 6).

Figure 6:
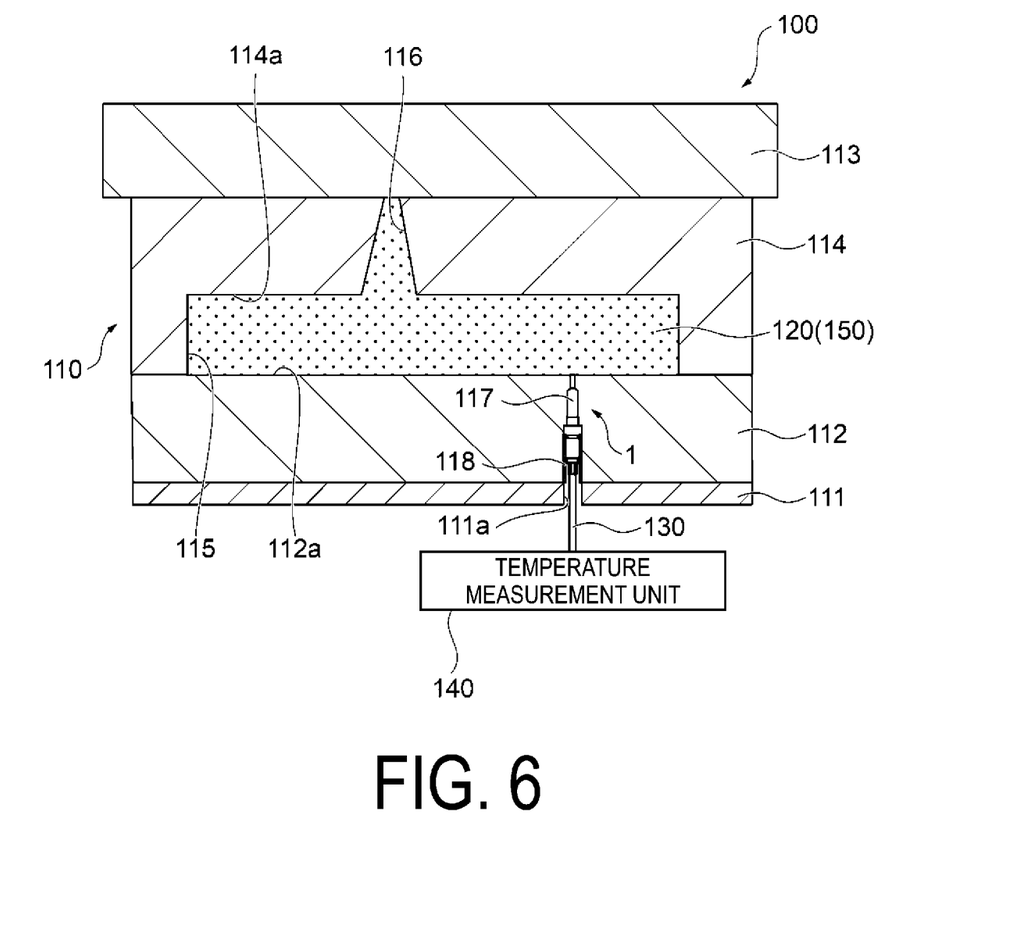
FIG. 6 is a cross-sectional view illustrating a state where the temperature sensor according to the embodiment of the present invention is attached to a die of a resin molding device.

One end side surface 11a of the columnar portion 11 is the tip of the temperature sensor 1, and is the temperature measuring contact for the resin 120 (FIG. 6). The one end side surface 11a of the columnar portion 11 is a circular or substantially circular plane extending orthogonally or substantially orthogonally to the direction of the axis line Y1 with the axis line Y1 as the center. The metal sheath 10 is formed of, for example, stainless steel, but other various metals can be used.

The pair of thermocouple element wires 20 each extend at a predetermined interval in parallel or substantially parallel with the direction of the axis line Y1 in the metal sheath 10, and are each formed in a thin line shape or a substantially thin line shape. One thermocouple element wire of the pair of thermocouple element wires 20 is a thermocouple element wire 21 formed of, for example, a platinum-rhodium alloy, and the other thermocouple element wire of the pair of thermocouple element wires 20 is a thermocouple element wire 22 formed of, for example, platinum or a platinum-rhodium alloy.

Each of the thermocouple element wires 21 and 22 has one end side welded to the other end side surface 11b of the columnar portion 11 of the metal sheath 10, and has another end side connected to a cable 130 (FIG. 6) formed of a compensation lead wire (not illustrated). Note that each of the thermocouple element wires 21 and 22 can be formed of, for example, alumel and chromel, and other various metals used as a thermocouple can be used.

The insulator 30 fills the metal sheath 10 so as to cover a periphery of each of the thermocouple element wires 21 and 22, and insulates and holds the thermocouple element wires 21 and 22. The insulator 30 is formed of, for example, magnesia powder (MgO), but other various insulators can be used.

The housing 40 extends in parallel or substantially parallel with the direction of the axis line Y1 with the axis line Y1 as the center, and includes a tubular portion 41 formed in a cylindrical shape or a substantially cylindrical shape. The tubular portion 41 includes a tip portion 42 at one end side, a crimp portion 43 at another end side, and a flange portion 44 at a center portion in the direction of the axis line Y1. The housing 40 is formed of, for example, stainless steel harder than the metal sheath 10, but other various metals different from the metal sheath 10 can be used.

The tip portion 42 extends in parallel or substantially parallel with the direction of the axis line Y1 with the axis line Y1 as the center, and is formed in a cylindrical shape or a substantially cylindrical shape. The tip portion 42 is coaxial with the tubular portion 41, and communicates with the tubular portion 41. The diameter at one end side of the tubular portion 41 is reduced, and the diameter of the tip portion 42 is smaller than that of the tubular portion 41. The diameter of a tip of the tip portion 42 is, for example, equal to or less than 1 mm. Note that the diameter of the tip portion 42 may be greater than 1 mm.

An inner diameter of the tip portion 42 is slightly smaller than a diameter of the metal sheath 10, and the tip portion of the metal sheath 10 is tightly fitted (press-fitted) into the tip portion 42. In other words, the tip portion 42 covers a portion of the columnar portion 11 and the cylindrical portion 12 of the metal sheath 10. A tip side surface 42a of the tip portion 42 is an annular or substantially annular plane extending orthogonally or substantially orthogonally to the direction of the axis line Y1 with the axis line Y1 as the center.

The tip side surface 42a of the tip portion 42 is flush with the one end side surface 11a of the columnar portion 11 of the metal sheath 10. The tip side surface 42a of the tip portion 42 and the one end side surface 11a of the columnar portion 11 of the metal sheath 10 are welded together, and thus the tip portion 42 and the metal sheath 10 can be fixed together without a gap. The tip portion of the temperature sensor 1 is formed of the tip portion 42 and the grounded sheath thermocouple (the metal sheath 10, the pair of thermocouple element wires 20, and the insulator 30) accommodated in the tip portion 42, and the tip of the temperature sensor 1 is formed of the tip side surface 42a of the tip portion 42 and the one end side surface 11a of the columnar portion 11 of the metal sheath 10.

The crimp portion 43 extends in parallel or substantially parallel with the direction of the axis line Y1 with the axis line Y1 as the center, and is formed in a cylindrical shape or a substantially cylindrical shape. The crimp portion 43 is coaxial with the tubular portion 41, and communicates with the tubular portion 41. The diameter of the crimp portion 43 is smaller than that of the tubular portion 41, and the crimp portion 43 fixes the metal sheath 10 to the housing 40 by crimping a portion of the metal sheath 10. The flange portion 44 is an annular or substantially annular flange extending from a circumferential surface of the tubular portion 41 toward a circumferential side at the center portion of the tubular portion 41 in the direction of the axis line Y1.

Figure 7:
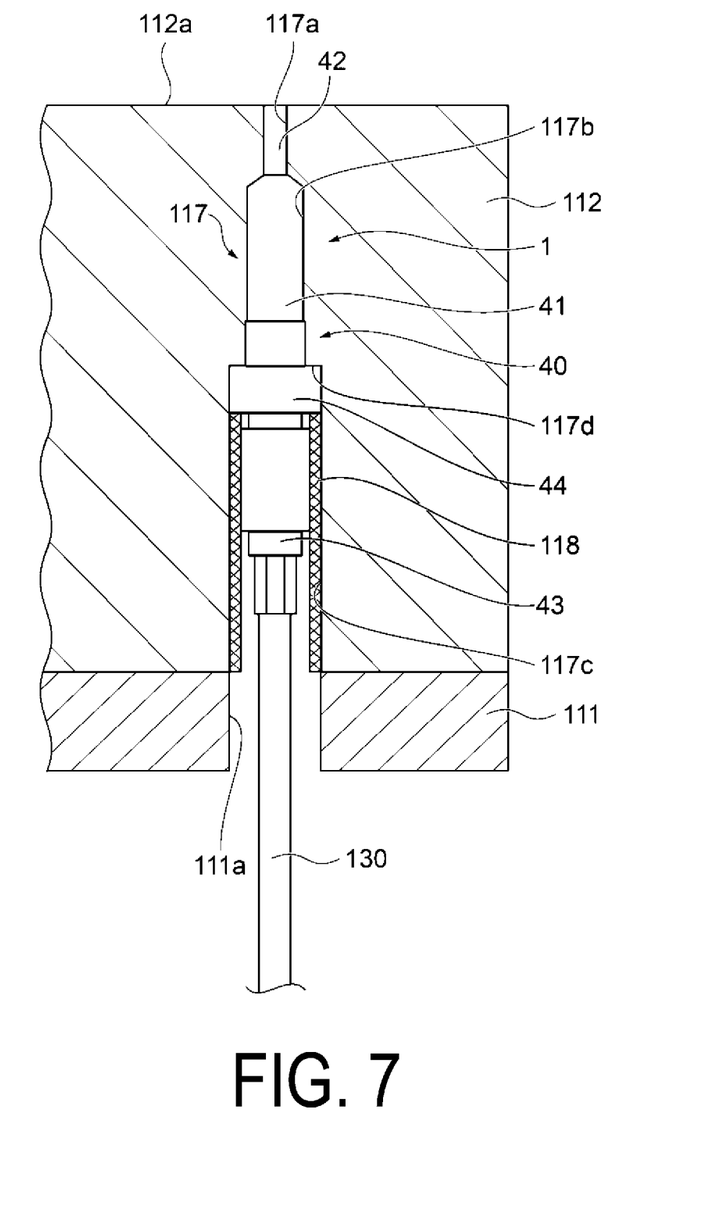
FIG. 7 is a cross-sectional view illustrating the state where the temperature sensor according to the embodiment of the present invention is attached to the die of the resin molding device.

Next, a state where the temperature sensor 1 is attached to the die 110 of the resin molding device 100 will be described. FIGS. 6 and 7 are cross-sectional views illustrating the state where the temperature sensor 1 according to the embodiment of the present invention is attached to the die 110 of the resin molding device 100. The die 110 of the resin molding device 100 includes a fixed-side mounting plate 111, the fixed-side die 112, a movable-side mounting plate 113, and a movable-side die 114. In the die 110, the fixed-side die 112 is attached to the fixed-side mounting plate 111, and the movable-side die 114 is attached to the movable-side mounting plate 113.

For example, a recess portion 114a having a cross-sectional rectangular shape or a substantially cross-sectional rectangular shape is formed at the movable-side die 114, and a cavity 115 is formed by the movable-side die 114 and the fixed-side die 112. Further, a gate 116 for filling the cavity 115 with the resin 120 is formed at the recess portion 114a of the movable-side die 114.

A mounting plate through hole 111a (or a wiring groove) is formed at the fixed-side mounting plate 111, a die through hole 117 is formed at the fixed-side die 112, and the mounting plate through hole 111a and the die through hole 117 communicate with each other. The temperature sensor 1 is inserted and fixed into the die through hole 117 of the fixed-side die 112. The die through hole 117 includes a tip portion fixing hole 117a, a tubular portion fixing hole 117b, and another end side through hole 117c.

The tip portion fixing hole 117a is formed in a shape corresponding to the tip portion 42 of the housing 40, and is a hole slightly smaller than the diameter of the tip portion 42 of the housing 40, and the tip portion 42 is tightly fitted (press-fitted) into the tip portion fixing hole 117a. The tubular portion fixing hole 117b is a hole larger than the tip portion fixing hole 117a. The tubular portion fixing hole 117b is formed in a shape corresponding to the tubular portion 41 closer to a tip portion side than the flange portion 44. The tubular portion fixing hole 117b is a hole slightly smaller than the diameter of the tubular portion 41 closer to the tip portion side than the flange portion 44, and the tubular portion 41 closer to the tip portion side than the flange portion 44 is tightly fitted (press-fitted) into the tubular portion fixing hole 117b.

The other end side through hole 117c is a hole larger than the tubular portion fixing hole 117b, and a step surface 117d is formed between the other end side through hole 117c and the tubular portion fixing hole 117b. The other end side through hole 117c is a hole having the same or substantially the same diameter as that of the flange portion 44, and includes a fixing spacer 118. The fixing spacer 118 is, for example, a cylindrical or substantially cylindrical pipe, has an outer diameter slightly larger than that of the other end side through hole 117c, and is press-fitted into the other end side through hole 117c. Further, the fixing spacer 118 has an inner diameter slightly smaller than that of the center portion of the tubular portion 41 closer to the other end side than the flange portion 44, and fixes, into the other end side through hole 117c, the tubular portion 41 closer to the other end side than the flange portion 44.

The tip of the temperature sensor 1 is flush with a cavity side surface 112a of the fixed-side die 112. The tip portion 42 of the housing 40 of the temperature sensor 1 is fixed by the tip portion fixing hole 117a, and the tubular portion 41 closer to the tip portion side than the flange portion 44 of the housing 40 of the temperature sensor 1 is fixed by the tubular portion fixing hole 117b. The tubular portion 41 closer to the other end side than the flange portion 44 of the housing 40 of the temperature sensor 1 is fixed by the fixing spacer 118 in the other end side through hole 117c.

The flange portion 44 of the housing 40 of the temperature sensor 1 abuts against the step surface 117d between the other end side through hole 117c and the tubular portion fixing hole 117b, and the temperature sensor 1 is aligned by the step surface 117d. In this way, in the resin molding device 100, the tip of the temperature sensor 1 and the cavity side surface 112a of the fixed-side die 112 are located at the same plane.

The thermocouple element wires 21 and 22 of the temperature sensor 1 are connected to the cable 130 formed of the compensation lead wire (not illustrated) at the other end side, and the temperature sensor 1 is connected to the temperature measurement unit 140 via the cable 130. Note that, in the die 110, a plurality of the cavities 115 may be formed between the fixed-side die 112 and the movable-side die 114, the temperature sensor 1 corresponding to the individual cavity 115 may be provided, and the plurality of temperature sensors 1 may be connected to the temperature measurement unit 140. Further, the plurality of temperature sensors 1 may be provided in one cavity 115.

During resin molding, in the resin molding device 100, the movable-side die 114 is moved, the movable-side die 114 abuts against the fixed-side die 112, and the cavity is filled with the resin 120 melted via the gate 116. Then, the resin molding device 100 molds a resin molded product 150 by cooling and hardening the resin 120 filling the cavity. Subsequently, in the resin molding device 100, the movable-side die 114 is moved, the movable-side die 114 is separated from the fixed-side die 112, the resin molded product 150 is ejected by an ejector pin (not illustrated), and the resin molded product 150 is taken out from the movable-side die 114.

Herein, when the cavity is filled with the melted resin 120, the melted resin 120 abuts against the temperature measuring contact of the tip of the temperature sensor 1, the temperature of the temperature measuring contact of the temperature sensor 1 increases, and a temperature difference is caused between the temperature measuring contact of the temperature sensor 1 and a reference contact. Consequently, a voltage is generated in the thermocouple element wires 21 and 22 of the temperature sensor 1, and a minute current flows through the thermocouple element wires 21 and 22. The temperature measurement unit 140 measures, via the cable 130, the current flowing through the thermocouple element wires 21 and 22 of the temperature sensor 1, and measures a temperature of the resin 120 based on the measured current. Further, the temperature measurement unit 140 also measures the temperature of the resin 120 based on the measured current until the resin 120 filling the cavity is cooled and hardened, and the resin molded product 150 is separated from the measuring contact of the temperature sensor 1.

In this way, the temperature sensor 1 according to the embodiment of the present invention is a temperature sensor configured to measure the temperature of the resin 120 filling the die 110 (and/or the fixed-side die 112) in the resin molding device 100. The temperature sensor 1 includes the metal sheath 10 having a bottomed tubular shape, the pair of thermocouple element wires 20 accommodated in the metal sheath 10, and the insulator 30 provided around the pair of thermocouple element wires 20 in the metal sheath 10, and the temperature sensor 1 is the grounded sheath thermocouple including a tip as the temperature measuring contact of the resin 120. Further, the temperature sensor 1 further includes the housing 40 covering the periphery of the tip portion of the metal sheath 10, and the tip of the metal sheath 10 has a planar shape. Further, in the temperature sensor 1, at least a portion of the metal sheath 10 is crimped to the housing 40. Since the temperature sensor 1 is the grounded sheath thermocouple, two holes for guiding thermocouple element wires do not need to be processed and the thermocouple element wires also do not need to be assembled into the two holes as is the case with a temperature sensor conventionally used in the resin molding device 100. Therefore, in the temperature sensor 1, processability and assemblability of the temperature sensor 1 when the temperature sensor 1 is used in the resin molding device 100 can be improved.

Further, since the periphery of the tip portion of the metal sheath 10 is covered by the housing 40, breakage of the metal sheath 10 of the temperature sensor 1 when the temperature sensor 1 is fixed to the movable-side die 114 can be prevented, and the assemblability when the temperature sensor 1 is fixed to the movable-side die 114 can be improved. Further, since the tip of the metal sheath 10 has a planar shape, a portion abutting the resin molded product 150 molded in the resin molding device 100 can be formed into a planar shape, and thus defects in the resin molded product 150 can be reduced. Further, at least a portion of the metal sheath 10 is crimped to the housing 40, and thus the metal sheath 10 can be firmly fixed to the housing 40.

Further, in the temperature sensor 1, since the two holes for guiding the thermocouple element wires do not need to be processed and the thermocouple element wires also do not need to be assembled into the two holes, and the processability and assemblability of the temperature sensor 1 can be improved, the diameter of the tip of the tip portion 42 can be, for example, equal to or less than 1 mm, and the size of the temperature sensor 1 can be reduced. Further, in the temperature sensor 1, since the tip side surface 42a of the tip portion 42 is flush with the one end side surface 11a of the columnar portion 11 of the metal sheath 10, a portion abutting against the resin molded product 150 molded in the resin molding device 100 can be formed into a planar shape, and a defect in the resin molded product 150 can be further reduced. Further, in the temperature sensor 1, since the tip side surface 42a of the tip portion 42 and the one end side surface 11a of the columnar portion 11 of the metal sheath 10 are welded together, the tip portion 42 and the metal sheath 10 can be fixed together without a gap.

Further, the resin molding device 100 constitutes the temperature measurement system consisting of the temperature sensor 1 attached to the die 110 and the temperature measurement unit 140 configured to measure the temperature of the resin 120 filling the die 110 by the temperature sensor 1. The temperature measurement unit 140 of the temperature measurement system measures, via the cable 130, the current flowing through the thermocouple element wires 21 and 22 of the temperature sensor 1, and measures the temperature of the resin 120 based on the measured current. Note that the temperature measurement unit 140 can measure the temperature of the resin 120 by various methods.

The embodiment of the present invention has been described above; however, the present invention is not limited to the embodiment of the present invention described above, and includes various aspects included in concepts and claims of the present invention. Further, each of the configurations may be selectively combined as appropriate so as to achieve at least a part of the problem and the effect described above. For example, a shape, a material, an arrangement, a size, and the like of each of the components in the embodiment described above may be changed as appropriate according to a specific usage aspect of the present invention.

For example, the embodiment of the present invention describes, as one example, a case where the temperature sensor 1 according to the embodiment of the present invention further includes the housing 40 covering the periphery of the tip portion of the metal sheath 10, the tip of the metal sheath 10 has a planar shape, and at least a portion of the metal sheath 10 is crimped to the housing 40. However, the present invention is not limited to the embodiment, and when the temperature sensor 1 is used in the resin molding device 100, the temperature sensor 1 may be formed of the grounded sheath thermocouple.

In other words, in the temperature sensor 1 according to the embodiment of the present invention, the housing 40 need not cover the periphery of the tip portion of the metal sheath 10, and the metal sheath 10 may be fixed to the die through hole 117 of the movable-side die 114. Further, in the temperature sensor 1, the tip of the metal sheath 10 need not have a planar shape, and may have a shape such that the tip of the temperature sensor 1 and the cavity side surface 112a of the fixed-side die 112 are located at the same plane. For example, when the cavity side surface 112a of the fixed-side die 112 has a curved shape, the tip of the temperature sensor 1 including the tip of the metal sheath 10 may have a curved shape along the cavity side surface 112a of the fixed-side die 112. Further, in the temperature sensor 1, at least a portion of the metal sheath 10 need not be crimped to the housing 40, and at least a portion of the metal sheath 10 may be fixed to the housing 40.

REFERENCE SIGNS LIST

1 Temperature sensor
10 Metal sheath
20 Pair of thermocouple element wires
30 Insulator
40 Housing
100 Resin molding device
110 Die
120 Resin

The invention claimed is:

1. A temperature sensor configured to measure a temperature of a resin filling a die in a resin molding device, the temperature sensor comprising:
   a metal sheath having a bottomed cylindrical shape;
   a pair of thermocouple element wires accommodated in the metal sheath; and
   an insulator provided around the pair of thermocouple element wires in the metal sheath, wherein
   the temperature sensor is a grounded sheath thermocouple including a tip as a temperature measuring contact for the resin,
   the temperature sensor further includes a housing covering a periphery of a tip portion of the metal sheath, and
   a tip as one side surface of the metal sheath has a planar shape, wherein
   the metal sheath comprises:
      a columnar portion that functions as a temperature sensing portion that has a columnar shape and comprises the one side surface; and
      a cylindrical portion that is provided upright from the columnar portion and that has a cylindrical shape, wherein
   the columnar portion and the cylindrical portion are integrally formed of a same material, and wherein
   each of the pair of the thermocouple element wires has one end side welded to another side surface of the columnar portion of the metal sheath.

2. The temperature sensor according to claim 1, wherein a diameter of a tip of the housing is equal to or less than 1 mm.

3. The temperature sensor according to claim 1, wherein one end side surface of the columnar portion of the metal sheath and a tip side surface of a tip portion of the housing are flush and wherein
the one end side surface and the tip side surface are welded together.

4. The temperature sensor according to claim 1, wherein at least a portion of the metal sheath is crimped to the housing.

5. A temperature measurement system, comprising:
the temperature sensor according to claim 1, in the resin molding device; and
a temperature measurement unit configured to measure the temperature of the resin filling the die by using the temperature sensor.

\* \* \* \* \*